No. 715,401. Patented Dec. 9, 1902.
G. A. LOWRY.
NIPPERS.
(Application filed May 24, 1901.)
(No Model.)
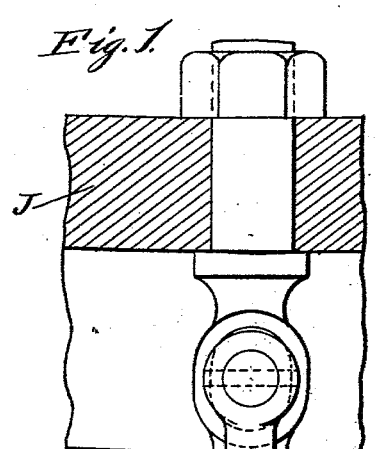
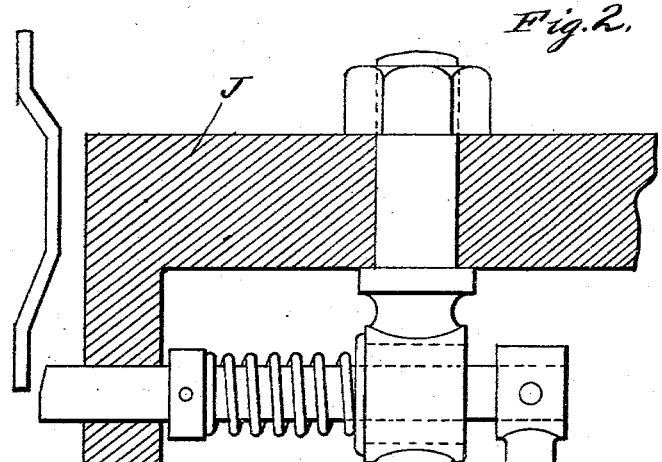
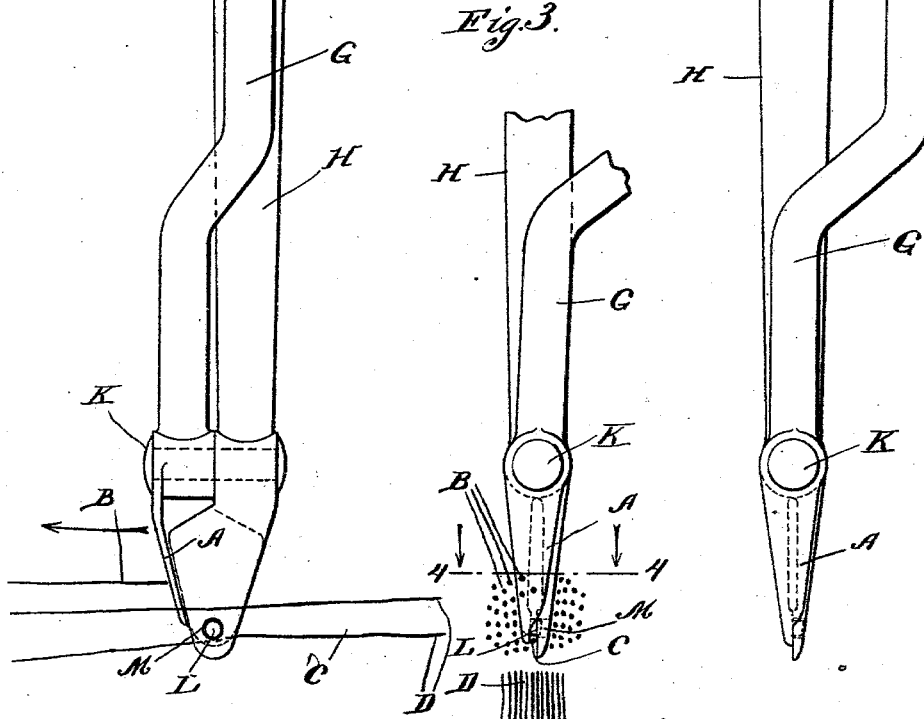
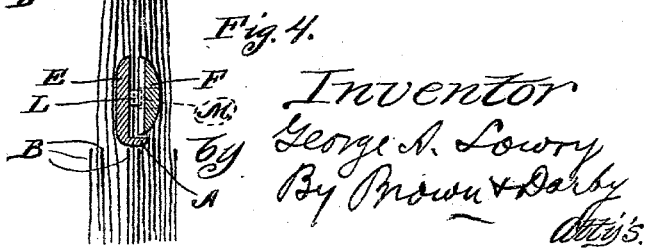
Witnesses
Wm. M. Rheem
Ira D. Perry
Inventor
George A. Lowry
By Brown & Darby
Attys.

UNITED STATES PATENT OFFICE.

GEORGE A. LOWRY, OF CHICAGO, ILLINOIS.

NIPPERS.

SPECIFICATION forming part of Letters Patent No. 715,401, dated December 9, 1902.

Application filed May 24, 1901. Serial No. 61,706. (No model.)

*To all whom it may concern:*

Be it known that I, GEORGE A. LOWRY, a citizen of the United States, residing at Chicago, in the county of Cook and State of Illinois, have invented a new and useful Nippers, of which the following is a specification.

This invention relates to nippers.

The object of the invention is to provide a construction of nipper for use in grass-twine making and similar machines, which is simple and efficient and wherein provision is made for preventing the entry of the stems or stalks of grass between the nipper-jaws at undesirable points.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in side elevation of a nipper embodying in the construction thereof the principles of my invention. Fig. 2 is a front elevation showing the manner of mounting the nipper. Fig. 3 is a broken detail view in front elevation, showing the nipper-jaws opened and in the act of passing through a mass of stems or stalks. Fig. 4 is a view in transverse section on the line 4 4 of Fig. 3 looking in the direction of the arrows.

The same part is designated by the same reference-sign wherever it occurs throughout the several views.

In the operation of machines for making grass twine and similar machines the grass stems or stalks are properly fed into the path of nippers, the nippers comprising relatively movable gripping-jaws arranged to be projected or moved into the mass of the stems or stalks of grass and opened to permit a stem or stalk of the grass to enter between the clamping-faces of the gripping-jaws, whereby upon closing such jaws said stem or stalk is gripped therebetween and is extracted by the further movement of the nipper from the mass and delivered by the opening of the nipper-jaws at a suitable point for the further treatment or operation upon such stems or stalks. The present invention relates to nippers of this class.

It has been found in practice, in the practical operation of grass-twine making or similar machines, that while the nippers are passing into the mass of stems or stalks of the grass or similar material some of the stems or stalks, and especially the shorter ones, frequently enter the space between the opposing faces of the clamping-jaws of the nipper at undesirable points while the jaws are opened and remain between such opposing faces when the jaws are closed, so that when the nippers are moved to the point of delivery therefrom of the clamped stem or stalk it carries with it a greater quantity of stems or stalks than is required, which is deposited along with the proper stem or stalk and worked into the twine or other article produced, thereby rendering such product of varying thickness or size. It sometimes happens, however, that instead of the stems or stalks being deposited in the manner above referred to and worked up into the finished product they remain between the clamping-jaws of the nipper, and by successive accumulation between such jaws they eventually clog the nipper, so that the clamping-surfaces of the jaws thereof which effect the clamping of the desired stems or stalks will not efficiently close up to grip the stems or stalks, thus impairing the efficiency and uniformity of the feed of the material operated on. The present invention is designed to overcome this difficulty, and in carrying the invention into practical operation I provide a shield, the purpose of which is to prevent the entry of stems or stalks between the opposed faces of the clamping-jaws of the nipper, whether said clamping-jaws are opened or not, except at the point where the desired clamping or gripping of the stem or stalk is desired. This protecting-shield may be embodied as a feature on many specifically different constructions of nippers, and while I have shown and will now describe a particular construction of nipper embodying the invention and a manner of mounting and operating the same, I do not desire to be limited or restricted thereto.

In the particular form shown reference-signs E F designate the nipper-jaws, said jaws in the particular form shown being formed on the extremities of arms G and H, respectively, the arm H being in the form of a stem adapted to be supported in a suitable manner upon a carrier J in the usual or any well-known manner and the arm G being hinged or pivoted to the stem H, as at K. In the usual construction of nippers of this class one of the clamping-jaws is provided with a stud or pin L, and the other of said jaws is provided with an opening M, into which the pin or stud L projects, thereby forming a limit-stop to govern the extent of entry of the stems or stalks between the gripping-faces of the nipper-jaws. It frequently happens, however, as above stated, that stems or stalks of grass or other similar material will be caught between the nipper-jaws at a point above the pin or stud L when the nipper is projected into the mass of material to be fed thereby, thus giving rise to the objections above noted. This is particularly true of short stems or stalks, which would otherwise be missed by the nipper while passing through the mass of material. This action is illustrated most clearly in Figs. 3 and 4, wherein the reference-sign D designates the butt-ends of the longer and desired stems or stalks, and B designates the butt-ends of the shorter and undesirable stems or stalks, and C the stems or stalks which are to be gripped and fed by the nippers. In order to prevent the undesirable stems or stalks from entering into the space between the nipper-jaws I provide one of the nipper-jaws with a shield or flange (indicated at A) arranged to project laterally from the one jaw across the forward edge of the other jaw, as clearly shown in the drawings, so as to cover the opening between said jaws, said flange or shield extending to a point about in line with the pin L, this latter flange or projection serving to prevent the undesirable stems or stalks from entering the space between the clamping-jaws while the nipper is being moved through the mass of material in the direction indicated in Fig. 1, the flange or protecting-shield A closing the forward edge of the opening between said jaws.

It is obvious that this idea of a protecting-shield may be embodied in many other specific constructions and arrangements, and I do not desire, therefore, to limit myself to the specific construction and arrangement of such protecting-shield. The particular form shown, however, is simple and efficient and is the best method in which I at present contemplate carrying out my invention.

Having now set forth the object and nature of my invention and a construction embodying the principles thereof, what I claim as new and useful and of my own invention, and desire to secure by Letters Patent, is—

1. A nipper comprising relatively movable jaws adapted to be projected into a mass of stems or stalks and grasp one or more of such stems or stalks therebetween, in combination with a protecting-shield arranged across the opening between said jaws or the forward edges thereof, as and for the purpose set forth.

2. The combination with a nipper having clamping-jaws, adapted to be projected into a mass of stems or stalks of grass, of a shield carried by one of said jaws and arranged to close the space between said jaws at the front edges thereof, as and for the purpose set forth.

3. In a nipper, the combination with clamping-jaws adapted to be projected into a mass of stems or stalks of grass, one of said jaws provided with a flange arranged to extend across the front edge of the space between said jaws, as and for the purpose set forth.

4. In a nipper, the combination of clamping-jaws suitably pivoted together, means for limiting the extent of entry of the material between said jaws, and a shield arranged to close the opening between said jaws above said limiting means, as and for the purpose set forth.

5. A nipper having clamping-jaws, said jaws provided with a limiting pin or stop, in combination with a protecting shield or flange for closing the space between said jaws above said limiting-pin, as and for the purpose set forth.

6. The combination with pivotally-connected nipper-jaws, one of said jaws provided with a lateral or angular flange arranged to extend across the front edge of the other of said jaws to prevent the entry of stems or stalks into the space between such jaws, said protecting shield or flange terminating a short distance from the extreme end of said jaws, as and for the purpose set forth.

In witness whereof I have hereunto set my hand, this 22d day of May, 1901, in the presence of the subscribing witnesses.

GEORGE A. LOWRY.

Witnesses:
 E. C. SEMPLE,
 S. E. DARBY.